United States Patent [19]

Kanamori et al.

[11] Patent Number: 5,385,594
[45] Date of Patent: Jan. 31, 1995

[54] METHOD FOR FABRICATING AN OPTICAL WAVEGUIDE

[75] Inventors: Hiroo Kanamori; Akira Urano; Haruhiko Aikawa; Shinji Ishikawa; Chisai Hirose; Masahide Saito, all of Yokohama, Japan

[73] Assignee: Sumitomo Electric Industries, Ltd., Osaka, Japan

[21] Appl. No.: 986,001

[22] Filed: Dec. 4, 1992

[30] Foreign Application Priority Data

Dec. 6, 1991 [JP] Japan .................. 3-323093

[51] Int. Cl.$^6$ ............................ C03C 17/00
[52] U.S. Cl. ..................... 65/60.2; 65/60.5; 65/386; 65/399; 427/162; 427/224; 427/419.7; 427/419.6; 427/314
[58] Field of Search ............... 65/3.1, 3.11, 3.12, 65/60.1, 60.2, 3.2, 60.4, 60.5, 18.2; 385/123, 127, 128, 130, 131, 132; 427/162, 224, 419.7, 419.6, 314, 372

[56] References Cited

U.S. PATENT DOCUMENTS

| 3,806,223 | 4/1974 | Keck et al. | |
| 3,934,061 | 1/1976 | Keck et al. | 65/60.2 |
| 4,425,146 | 1/1984 | Izawa et al. | 65/18.2 |
| 5,215,564 | 6/1993 | Weber | 65/3.11 |

FOREIGN PATENT DOCUMENTS

| 0067050 | 12/1982 | European Pat. Off. |
| 0471139 | 2/1992 | European Pat. Off. |
| 0477898 | 4/1992 | European Pat. Off. |
| 2919619 | 11/1979 | Germany |
| 57-081213 | 8/1982 | Japan |
| 1574115 | 9/1980 | United Kingdom |

OTHER PUBLICATIONS

Miyashita, "Fiber Optic Component Technology in PIRI", NTT Review, vol. 1, No. 3, Sep. 1989.

*Primary Examiner*—W. Gary Jones
*Assistant Examiner*—Steven P. Griffin
*Attorney, Agent, or Firm*—Cushman Darby & Cushman

[57] ABSTRACT

In the first step, a fuel and raw material gases are fed to burner while flames from the burner scan a Si substrate. Synthesized fine glass particles are deposited on the substrate to form a first porous vitreous layer to be an under cladding layer. In the second step, the first porous vitreous layer is heated by the flames. A bulk density of an upper part of the first porous vitreous layer is raised to 0.3 g/cm$^3$. Having a raised bulk density, this upper part functions as a shield layer against GeO$_2$. In the third step, a second porous vitreous layer, to be a core layer, is deposited uniformly on the first porous vitreous layer. In the fourth step, the first and the second porous vitreous layers are sintered. In this case, the shield layer with a higher bulk density hinders the GeO$_2$ component which has evaporated from the second porous vitreous layer from diffusing into the first porous vitreous layer.

11 Claims, 8 Drawing Sheets

BULK DENSITY AND SPECIFIC REFRACTIVE INDEX DIFFERENCE

BULK DENSITY AND SPECIFIC REFRACTIVE INDEX DIFFERENCE

BULK DENSITY AND SPECIFIC REFRACTIVE INDEX DIFFERENCE

BULK DENSITY AND SPECIFIC REFRACTIVE INDEX DIFFERENCE

METHOD FOR FABRICATING AN OPTICAL WAVEGUIDE

BACKGROUND OF THE INVENTION

1. Field of the Invention

This invention relates to a process for forming an optical film structure for an optical waveguide and the optical waveguide by means of Flame Hydrolysis Deposition (FHD).

2. Related Background Art

FIGS. 1A–1C show fabricating steps of a conventional process for fabricating a film structure for an optical waveguide having under and over cladding layers and a core surrounded by them. In the step shown in FIG. 1A, a first porous vitreous layer ($SiO_2+B_2O_3+P_2O_5$) to be the under cladding layer 20 is made of $SiCl_4$, $BCl_3$ and $POCl_3$ on a substrate. In the step shown in FIG. 1B, a second porous vitreous layer ($SiO_2+GeO_2+B_2O_3+P_2O_5$) to be the core layer 30 is formed of $SiCl_4$, $GeCl_4$, $BCl_3$ and $POCl_3$ fed from a burner, on the substrate. In the step of FIG. 1C, all the porous vitreous layer are sintered to be transparent. Subsequently the transparent core layer 30 is patterned as required, and the over cladding layer (not shown) is formed thereon.

But, in this process for forming optical waveguide films, when all the porous vitreous layers are sintered, the $GeO_2$ component of the porous vitreous layer to be the core layer 30, i.e., core soot, adversely evaporates into the under cladding layer 20. This results in a problem that the $GeO_2$ component which has evaporated downward diffuses into the under cladding layer 20, and the interface between the core layer 30 and the cladding layer cannot be accurately controlled. FIG. 1C shows such state.

SUMMARY OF THE INVENTION

An object of this invention is to provide a process for forming optical waveguide films, which can accurately control the core/the cladding layer interface.

A process for forming an optical film structure for an optical waveguide according to this invention comprises the first step of depositing glass soot on a substrate, by FHD, to form a first porous vitreous layer to be an under cladding layer while increasing a bulk density of an upper part of the under cladding layer, thereby forming the under cladding layer the upper part, of which having a bulk density above a set bulk density; the second step of depositing soot which includes a refractive index increasing dopant upon the first porous vitreous layer, where the deposited soot becomes a core layer; and the third step of forming the first and the second porous vitreous layers into transparent glasses.

The set bulk density being great enough to substantially prevent the diffusion of the refractive index increasing dopant which is added to the second porous vitreous layer into the first porous vitreous layer.

A process for forming an optical waveguide which comprises the above-described steps for forming optical waveguide films followed by a fourth step of etching an optical waveguide pattern in the second porous vitreous layer, a fifth step of forming a third porous vitreous layer via FHD to be an over cladding layer on the second porous vitreous layer, and an optional sixth step of forming the third porous vitreous layer into transparent glass. The first step of this process may comprise the step of depositing glass soot on the substrate via FHD, and a second step of increasing a bulk density of at least the layer of deposited soot to a level which is above the set bulk density.

The first step may comprise the step of depositing soot on the substrate via FHD so that a layer of the deposited soot has a bulk density which is lower than the set bulk density, and the second step of depositing soot in said deposited soot layer via FHD so that the layer of the deposited soot has a bulk density which is lower than said set bulk density.

The first step may be for depositing soot on the substrate by FHD so that a layer of the deposited soot has a bulk density higher than said set bulk density, thereby forming the first porous vitreous layer to be the under cladding layer.

The above-described process for forming an optical film structure for an optical waveguide, and the process for forming an optical waveguide may be characterized by increasing the bulk density by increasing a temperature of an area of the deposited soot, by increasing a temperature of the substrate, by positioning the burner which is used for glass synthesizing for use in FHD nearer to the substrate, by increasing a feed amount of a fuel gas to the burner, or by other means.

The above-described refractive index dopant may be either of $GeO_2$, $P_2O_5$, $Al_2O_3$. A bulk density of at least the upper part of the first porous vitreous layer to be the under cladding layer is above about 0.3 $g/cm^3$. A bulk density of at least the upper part of the first porous vitreous layer is above that of the second porous vitreous layer.

As described above, according to this invention, a part of the first porous vitreous layer near the second porous vitreous layer has a higher bulk density. Because of the shielding effect of the neighboring part of a higher bulk density, a refractive index increasing dopant in the second porous vitreous layer, which evaporates when the first and the second porous vitreous layers are sintered, is prevented from diffusing into the first porous vitreous layer. As a result, an optical film structure for an optical waveguide can be formed with the interface between the core and the cladding optical layer accurately controlled.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

The principle of this invention will be briefly described below before examples of this invention are explained.

FIGS. 2A–2G show fabrication steps of the process for forming optical waveguide having a under cladding layer, a over cladding layer and a core surrounded by them according to the present invention. In the step shown in FIG. 2A, a burner 4 for glass synthesis scans over the surface of a substrate 1 while being fed with a fuel and raw material gases. Fine particles of quartz, glass synthesized in the burner 4, are fed onto the substrate 1 on flames. Thus, a first porous cladding layer 5 to be an under cladding layer 50 is uniformly deposited on the substrate.

Figure 1A:
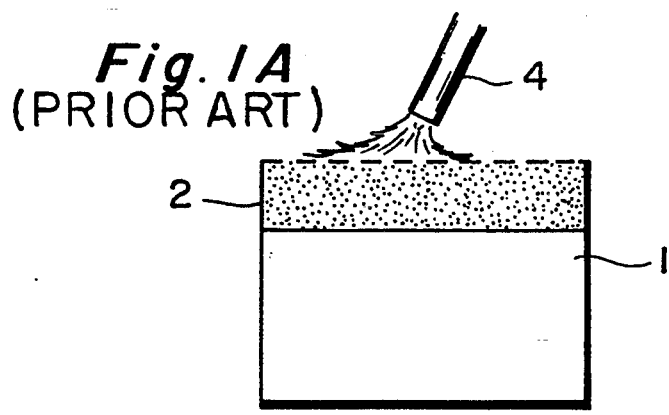
FIGS. 1A–1C show a conventional process for forming an optical film structure for an optical waveguide.
Figure 1B:
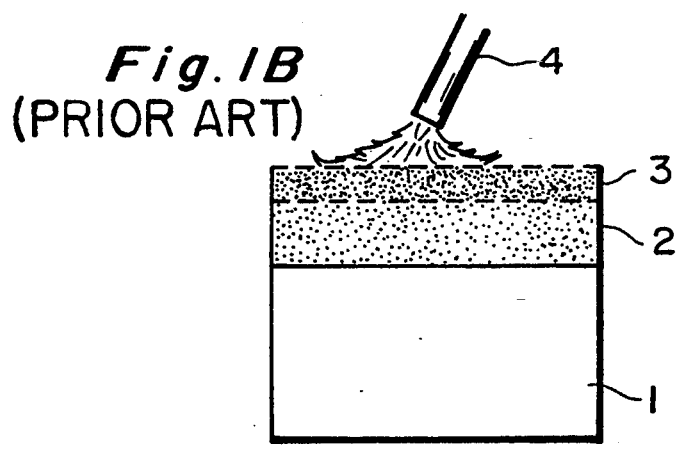
Figure 1C:
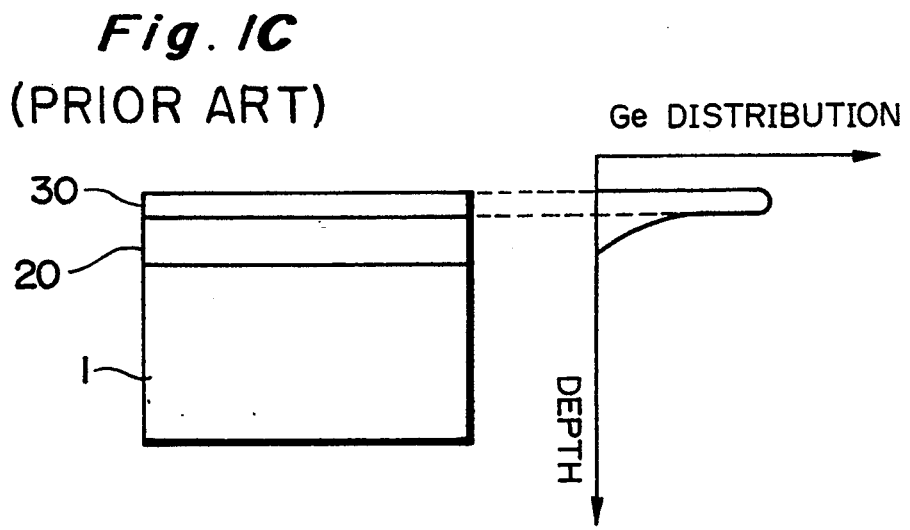
Figure 2A:
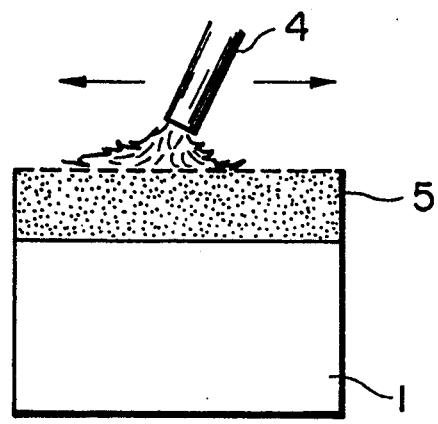
FIGS. 2A–2G show a process for forming a film structure for an optical waveguide films according to the present invention.
Figure 2B:
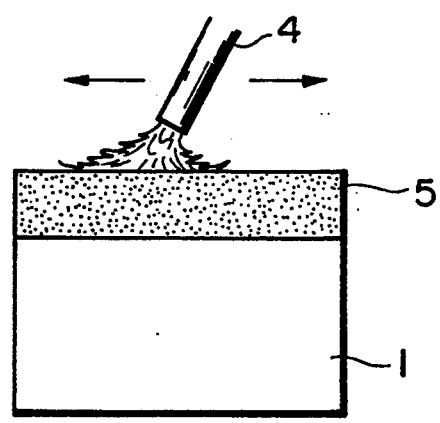

In the step shown in FIG. 2B, the supply of the raw material gases to the burner 4 is stopped, and thereafter the flame formed only by the fuel without including the raw material gases, scans an exposed surface of the first porous vitreous layer 5 to heat the upper part of the first porous vitreous layer 5. As a result, a bulk density of the upper part of the first porous vitreous layer 5 is increased. This upper part with an increased bulk density functions as a shield layer against a refractive index raising dopant, such as $GeO_2$ or others, so that the refractive index raising dopant is prevented from diffusing into the first porous vitreous layer 5.

Figure 2C:
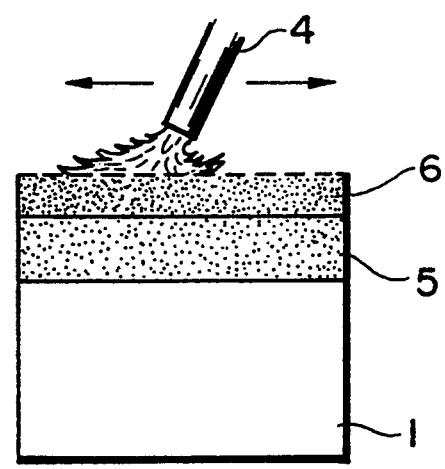

In the step shown in FIG. 2C, the burner 4 scans the substrate while being fed with the fuel and the raw material gases with the refractive index raising dopant. As a result, a second porous vitreous layer 8 to be a core layer 80 is deposited uniformly on the first porous vitreous layer 5.

Figure 2D:
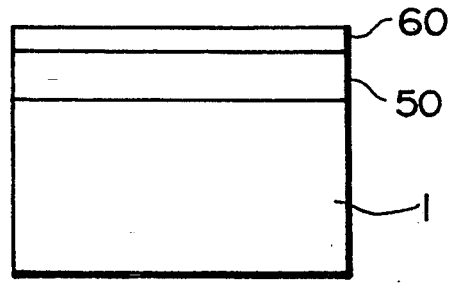

In the step of FIG. 2D, the first and the second porous vitreous layers 5 and 8 are heated to become vitreous as an under cladding layer 50 and the core layer 60 which are transparent. In this case, the upper part of the first porous vitreous layer 5 prevents the evaporated refractive index raising dopant from diffusing into the first porous vitreous layer 5. Thus an optical waveguide with the core layer 60 formed on the under cladding layer 50 can be prepared.

Figure 2E:
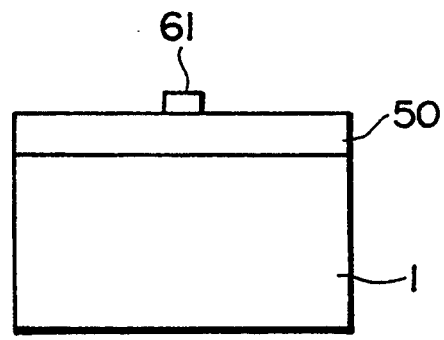
Figure 2F:
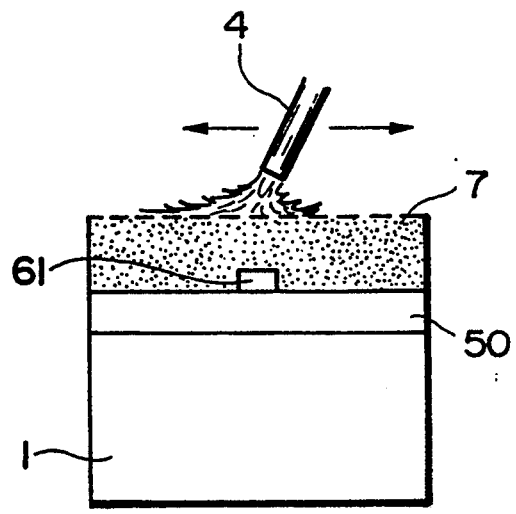
Figure 2G:
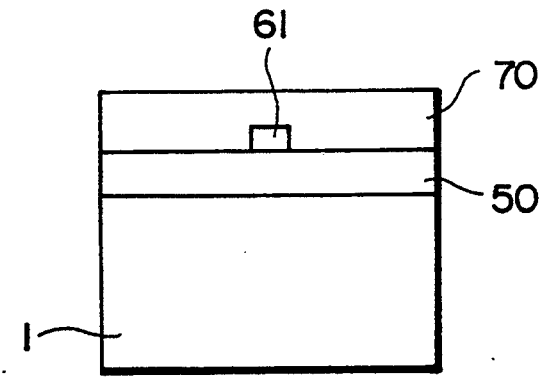

Subsequently, in the step of FIG. 2E, the core layer 60 is etched into a required pattern for a core 61 by RIE (Reactive Ion Etching) or others. In the step of FIG. 2F, a third porous vitreous layer 7 to be the over cladding layer 70 is deposited so as to cover the core layer 60. In the step shown in FIG. 2G, the third porous vitreous layer 7 is heated to become vitreous. Thus, an optical waveguide with the core 61 surrounded by the under and the over cladding layers 50 and 70 is prepared.

Figure 3A:
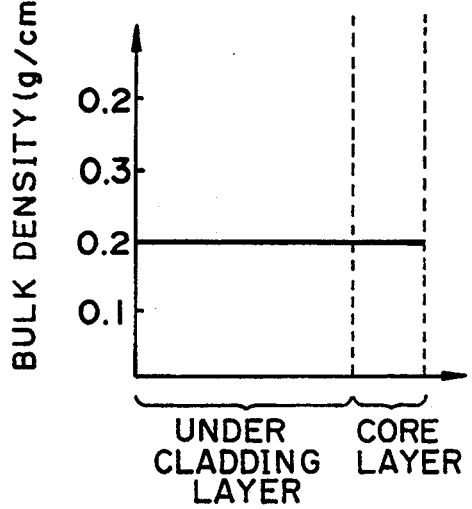
FIGS. 3A–3D are views for comparing the conventional process with the process according to the present invention.
Figure 3B:
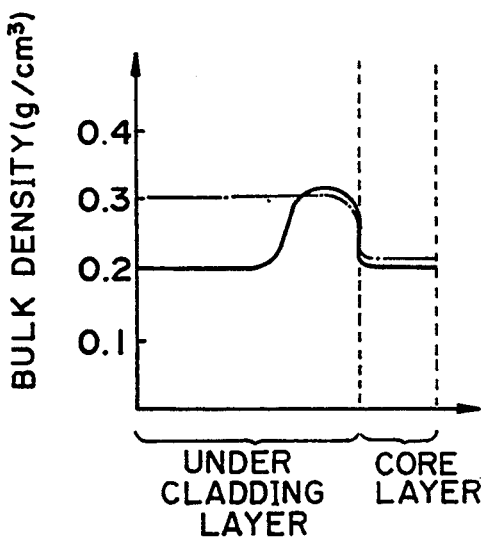

FIGS. 3A–3D show comparisons between the conventional process and the process according to the above embodiment. FIG. 3A is a graph showing bulk densities of the respective layer formed by the conventional process in which a shield layer is not formed. FIG. 3B is a graph showing bulk densities of the respective layers formed by the above mentioned process to the present invention in which the shield layer is formed in the upper part of the first porous vitreous layer 5 to be the under cladding layer 50. As shown in FIG. 3B, a part of the higher bulk density is formed in the under cladding layer 50 which is formed by the above-mentioned process. In FIG. 3B, the one-dot chain line schematically indicates an increased bulk density of the whole first porous vitreous layer 5 to be the under cladding layer 50. In this case as well, the upper part of the first porous vitreous layer 5 functions as a shield layer. It is possible to increase a bulk density of the second porous vitreous layer 8. But, due to the increased bulk density, within the under cladding layer, the second porous vitreous layer 6 precedes the first porous vitreous layer 5 in becoming transparent in the following sintering step. Therefore, adverse bubbles remain in the first porous vitreous layer 5.

Figure 3C:
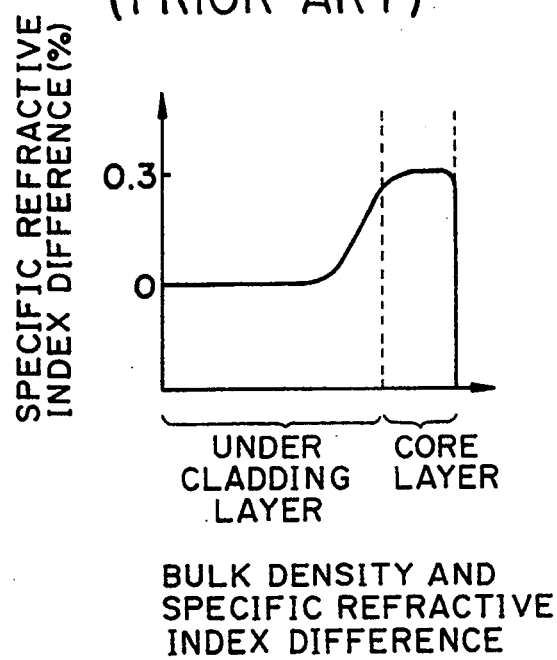
Figure 3D:
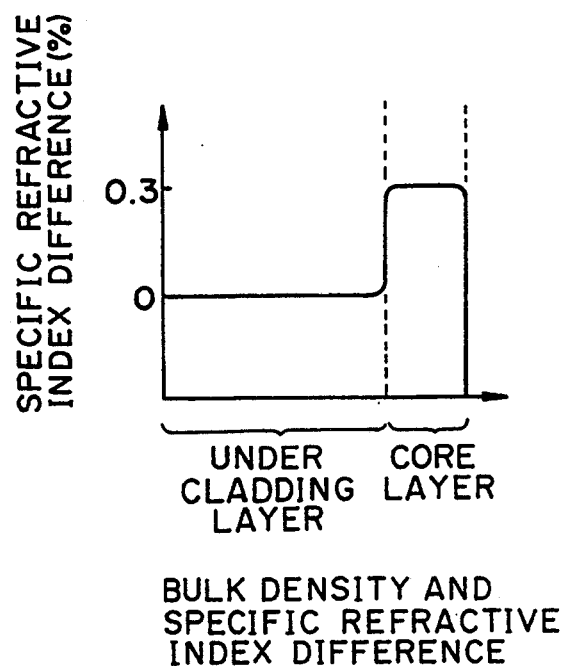

FIG. 3C shows a distribution of refractive indexes of the respective layers of FIG. 3A after sintered. FIG. 3D shows a distribution of refractive indexes of the respective layers of FIG. 3B after sintered. As shown, in the conventional process in which the shield layer is not formed, the refractive index raising dopant diffuses into the under cladding layer 20, and the refractive index gradually changes at the interface between the core layer (30) and the cladding layer (20). On the other hand, in the above-mentioned process according to the present invention, the refractive index raising dopant does not diffuse into the under cladding layer 50, and the refractive index changes in a step-like fashion at the interface between the core layer (60) and the cladding layer (50). That is, it is seen that the process according to the present invention can well control the formation of the interface between the core layer (60) and the cladding layer (50).

A first embodiment according to the present invention will be explained below.

Figure 4:
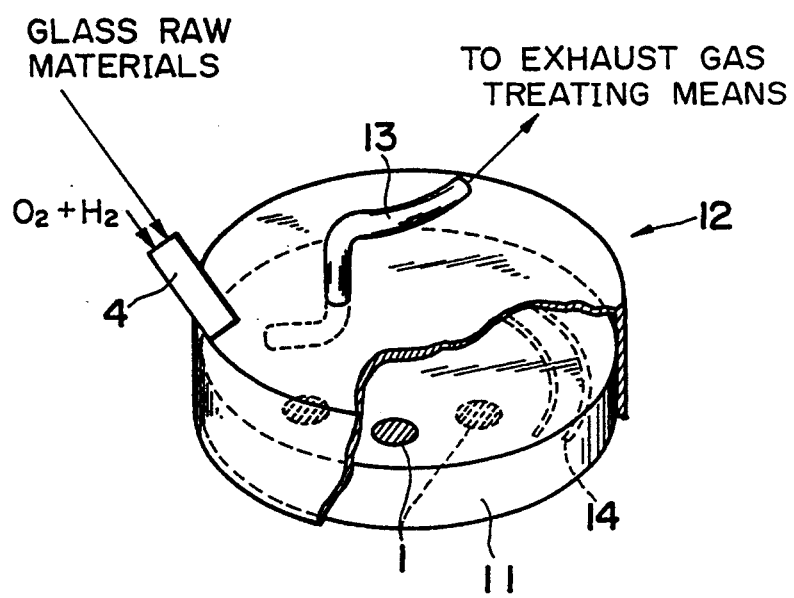
FIG. 4 is a schematic view of a device for depositing fine particles of glass.

Fine glass particles deposited in a film having $SiO_2$ as a main component are formed on a Si substrate by the device of FIG. 4.

Here, the device of FIG. 4, for depositing fine glass particles, will be explained. A reaction vessel 12 has the bottom formed in a rotary turntable 11 (of a 60-mm diameter). A plurality of substrate 1 (silicon wafers of a 3-inch (~75 mmΦ diameter) on which fine glass particles should be deposited by the burner 4 are placed in the vessel 12. An exhaust pipe 13 is provided for drawing out fine glass particles which have not been deposited on the substrates 1, and for exhausting gas from the vessel 12. The turn-table 11 on which the substrates 1 are mounted is rotated by a motor (not shown) with respect to center axis of the reaction vessel 12. The burner 4 reciprocates in the radial direction of the turn-table 11. Thus fine glass particles can be uniformly deposited on the substrates 1. In the bottom of the turn-table 11 there is provided a heater 14 for uniformly heating the substrates i mounted on the turn-table 11.

Using this device, fine glass particles for forming optical waveguide films are deposited. The turn-table 11 is rotated at a speed of 10 rpm while fuel and raw material gases are being fed to the burner 4 for synthesizing fine glass particles. On the other hand, the burner 4 is reciprocated over a 150-mm distance in the radial direction of the turn-table 11 at a speed of 30 mm/min. Thus, fine glass particle layers are uniformly deposited on the silicon wafers, which are to be the substrates 1. At this time the silicon wafers are heated up to about 580° C. by the heater 14 in the bottom of the turn-table 11.

In this case, the first step of forming a fine glass particle layer to be the under cladding layer 50 involved feeding the fuel and the raw materials to the burner 4 as follows. The feeding time of the fuel and the raw materials was 10 minutes.

$SiCl_4$: 50 cc/min.
$BCl_3$: 5 cc/min.
$POCl_3$: 3 cc/min.
$H_2$: 4 l/min.
$O_2$: 6 l/min.
Ar: 3 l/min.

The fuel and the raw materials fed to the burner 4 for the second step, wherein a glass fine particle layer is used to form the core layer 80 were as follows. The feeding time of the fuel and the raw materials was 5 minutes.

$SiCl_4$: 50 cc/min.
$BCl_3$: 5 cc/min.
$POCl_3$: 3 cc/min.
$GeCl_4$: 14 cc/min.
$H_2$: 4 l/min.
$O_2$: 6 l/min.
Ar: 3 l/min.

Subsequently, The silicon wafers with the fine glass particle layers formed thereon were heated for 1 hour at 1300° C., in an ambient atmosphere with a $He/O_2$ partial pressure ratio of 9/1, to form transparent vitreous under cladding layer 50 and the core layer 80.

Figure 5:
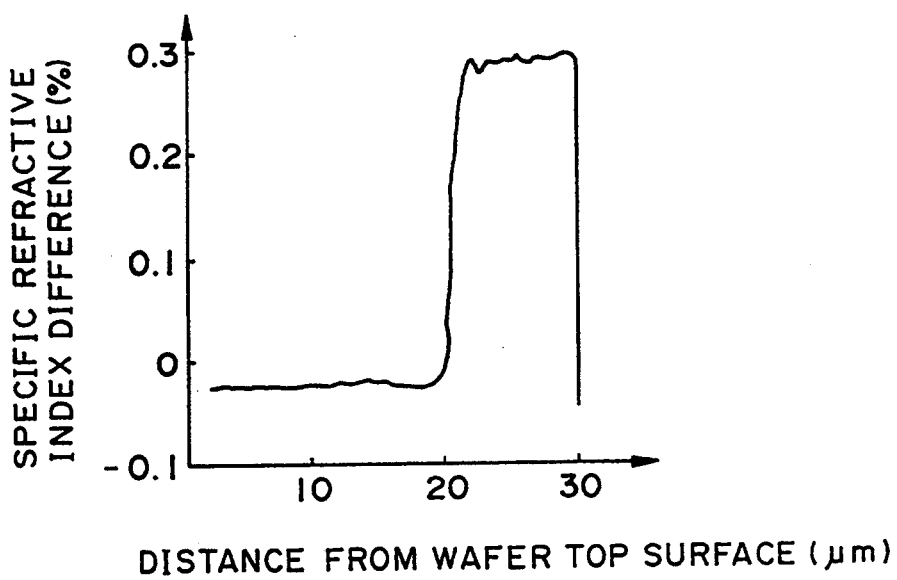
FIG. 5 is a view of a refractive index distribution of optical films formed by the process according to one example of the present invention.

FIG. 5 shows a film thickness-wise distribution of differences in specific refractive index between the under cladding layer 50 and the core layer 80 prepared in 20 the first embodiment and pure quartz glass. As apparent in FIG. 5, the refractive index changes in a step-like fashion at the interface between core layer (60) and the cladding layer (50). In this case, the distribution of the refractive indexes were measured by a transference microscope.

The fine glass particle layer for the under cladding layer 50 and that for the core layer 80, that is, the first and second porous layers 5 and 6, prepared in the first embodiment, respectively, had bulk densities of 0.32 $g/cm^3$ and 0.35 $g/cm^3$. That is, the bulk densities of the glass fine particle layers for the under cladding layer 50 and the core layer 60 prepared in the first embodiment are generally higher. It is considered that because of such increased bulk density of the glass fine particle layer, a good interface between the core layer 60 and the cladding layer interface could be prepared. In this case, the determination of the bulk densities were conducted by comparing thicknesses of the glass fine layers and an increase of a weight of the silicon wafer between the first embodiment and a control sample.

A second embodiment of this invention will be explained below. The second embodiment is substantially the same as the first embodiment. But, in the second step of forming the glass fine particle layer, that is, the second porous vitreous layer 6 for the core layer 60, the feed amount of $H_2$ was decreased to 3 l/min., and that of $GeCl_4$ was decreased to 10 cc/min. The feed amount of $GeCl_4$ was decreased, taking into consideration that a sticking probability of the Ge increases accompanying a decrease in a feed amount of $H_2$.

In the second embodiment, a satisfactory specific refractive index difference was obtained between the under cladding layer 50 and the core layer 60.

The glass fine particle layer for the under cladding layer 50 and that for the core layer 60, that is, the first and second porous layers 5 and 6, prepared in the second embodiment respectively have specific bulk densities of 0.32 $g/cm^3$ and 0.23 $g/cm^3$. The bulk density of the glass fine particle layer for the under cladding layer 50 prepared in the second embodiment was generally higher, and that of the glass fine particle for the core layer 60 was also generally higher. It is considered that owing to such increased bulk density of the glass fine particle layer for the under cladding layer 50, that is, the first porous vitreous layer 5, a satisfactory interface between the core layer 60 and the cladding layer could be prepared.

A third embodiment will be briefly described below. The process according to the third embodiment is substantially the same as that according to the second embodiment. But, in the first step of forming the glass fine particle layer for the under cladding layer 50, the feed amount of $H_2$ was decreased to 3 l/min. for the initial 8 minutes and increased to 4 l/min. for the last 2 minutes. Subsequently, in the same second step as in the second embodiment, the glass fine particle layer for the core layer 60 was formed.

The difference in specific refractive index between the under cladding layer 50 and the core layer 60 prepared in the third embodiment was as good as FIG. 5.

The bulk density of the glass fine particle layer for the under cladding layer 50 prepared in the third embodiment corresponding to the initial 8 minutes was 0.19 $g/cm^3$, and the bulk density of the part corresponding to the last 2 minutes was 0.32 $g/cm^3$. That is, the bulk density of the glass fine particle layer for the under cladding layer 50 is higher only in the upper part thereof. It is considered that because the increase of the bulk density only in the upper part of the glass fine particle layer, a good interface between the core layer 60 and the cladding layer could be prepared.

A fourth embodiment of this invention will be briefly described as follows. The process according to the fourth embodiment is basically the same as that according to the third embodiment. In the first step of forming the glass fine particle layer for the under cladding layer 50, the feed amount of $H_2$ was decreased to 3 l/min. for an entire period of 10 minutes. Following the first step, the feed of the raw materials were stopped with the fuel alone being fed (i.e., with $H_2$ fed by 4 l/min., $O_2$ fed by 6 l/min. and Ar fed by 3 l/min.) so that the glass fine particle layer for the under cladding layer 50 deposited on the silicon wafer is heated. Then, the glass fine particle layer for the core layer 60 was formed in the same second step as in the second and the third embodiments.

The difference in specific refractive index between the under cladding layer 50 and the core layer 60 prepared in the fourth embodiment was the same as FIG. 5.

The bulk density of the whole glass fine particle layer for the under cladding layer 50 prepared in the fourth embodiment was 0.27 $g/cm^3$ immediately before the formation of the glass fine particle layer for the core layer 60. It is considered that at least the uppermost part of the glass fine particle layer for the under cladding layer 50 was heated, so that the bulk density of the uppermost part has increased. The distribution of the bulk density of the interior of the glass fine particle layer for the under cladding layer 50 is not known. But since the effect of raising a bulk density using the burner having the feed of the raw materials stopped increases toward the uppermost part, the uppermost part of the glass fine particle layer has a bulk density above 0.27 $g/cm^3$.

Finally, controls will be described. The forming conditions of the controls are substantially the same as those of the first to the fourth embodiments. But, the fuel and raw materials fed in the first and the second steps are different.

In the first step of forming a glass fine particle layer for the under cladding layer 20, the following fuels and raw materials were fed for 10 minutes.

$SiCl_4$: 50 cc/min.
$BCl_3$: 5 cc/min.
$POCl_3$: 3 cc/min.
$H_2$: 3 l/min.
$O_2$: 6 l/min.
Ar: 3 l/min.

In the second step of forming a glass fine particle layer for the core layer 60, the following fuel and raw materials were fed for 5 minutes.

$SiCl_4$: 50 cc/min.
$BCl_3$: 5 cc/min.
$POCl_3$: 3 cc/min.
$GeCl_4$: 10 cc/min.
$H_2$: 3 l/min.
$O_2$: 6 l/min.
Ar: 3 l/min.

Figure 6:
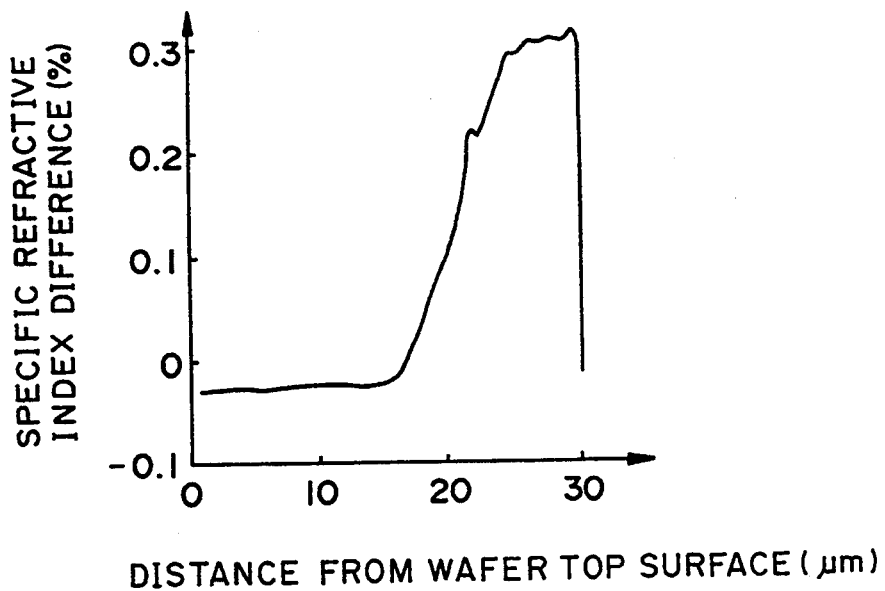
FIG. 6 is a view of a refractive index distribution of optical waveguide films formed by the process according to one control.

FIG. 6 shows a distribution of specific refractive indexes of the under cladding layer 20 and the core layer 30 prepared in the above-described control. As apparent between FIG. 6, the refractive index smoothly changes in the core layer (30) and the cladding layer (20).

The glass fine particle layer for the under cladding layer 20, and that for the core layer 30 had bulk densities of 0.19 $g/cm^3$ and 0.23 $g/cm^3$ respectively.

A method for measuring a bulk density of the glass fine particle layer will be explained below for reference. The explanation will be made with reference to the control. A glass fine particle layer, synthesized under the same conditions as stated above, had a thickness of 330 $\mu m$. The glass fine particles deposited on a 3 inch ($\sim$75 mm$\Phi$) silicon wafer was totally 290 mg. Accordingly, a bulk density of the composite layer of the under cladding layer 20 and the core layer 30 was $$0.29/((0.033\ cm) \times (7.5\ cm)^2 \times (3.14/4)) \sim 0.2\ g/cm^3.$$

The glass fine particle layer for the under cladding layer 20 had a thickness of 230 mm and a weight of 190 mg under the same conditions as stated above. Accordingly, a bulk density of the glass fine particle layer for the under cladding layer 20 was $$0.19\ g/((0.023\ cm) \times (7.5\ cm)^2 \times (3.14/4)) \sim 0.19\ g/cm^3$$

a bulk density of the glass fine particle layer for the under cladding layer 20 was estimated to be $$(0.29\ g - 0.19\ g)/((0.33 - 0.023)cm \times (7.5\ cm)^2 \times (3.14/4)) \sim 0.23\ g/cm^3.$$

Finally the relationships between diffusion ratios of Ge measured by electron probe micro-analysis (EPMA), and bulk densities of the porous vitreous layer, to be the under cladding layer, will be explained with reference to FIG. 7. FIG. 8 defines a parameter X for diffusion ratios of Ge. The parameter X is a distance from the position where the Ge concentration is 50 to the position where the Ge concentration is 5, when it is assumed that a peak value of the Ge concentration in the core layer is 100.

The Ge concentration measurement was conducted by cutting off the substrate with the glass films which had been formed in transparent glasses, into about 3 mm×10 mm samples. Then, the end surfaces of the pieces were polished, and depth-wise Ge concentration distributions of the pieces were measured by EPMA. As such measuring samples, four kinds of samples were prepared in accordance with Embodiment 1 and Control 1, Embodiment 1 with a $H_2$ flow rate of 4.5 l/min. in the first step, and for Embodiment 1 with a $H_2$ flow rate of 3.5 l/min.

Figure 7:
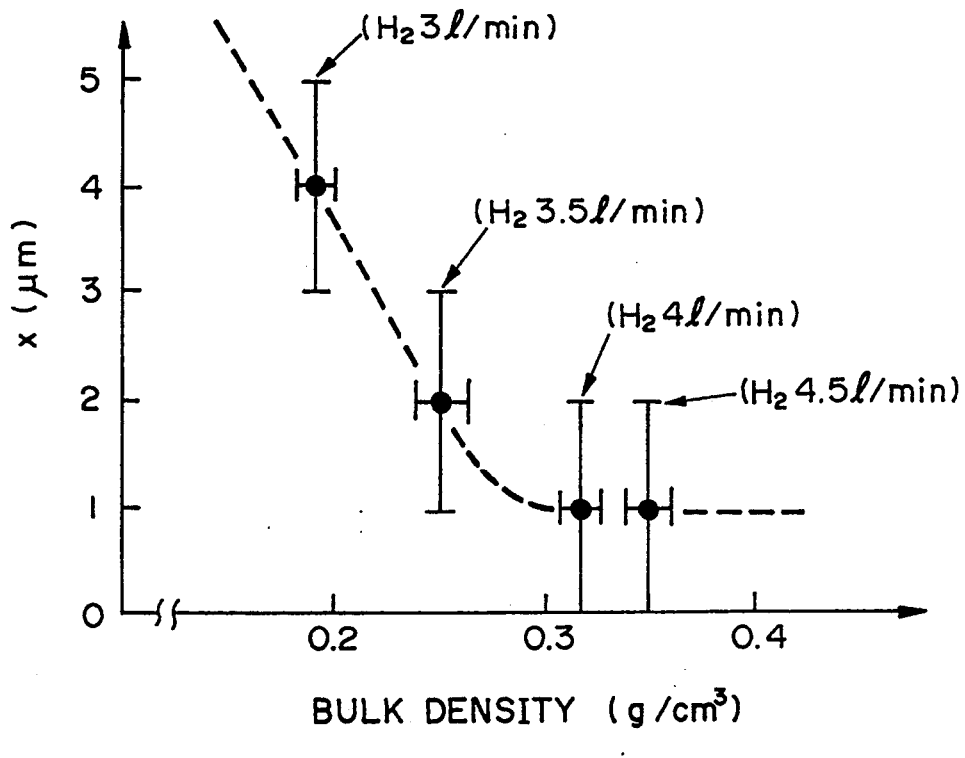
FIG. 7 is a view showing relationships between diffusion ratios of Ge and bulk densities of the porous vitreous layer to be the under cladding layer.
Figure 8:
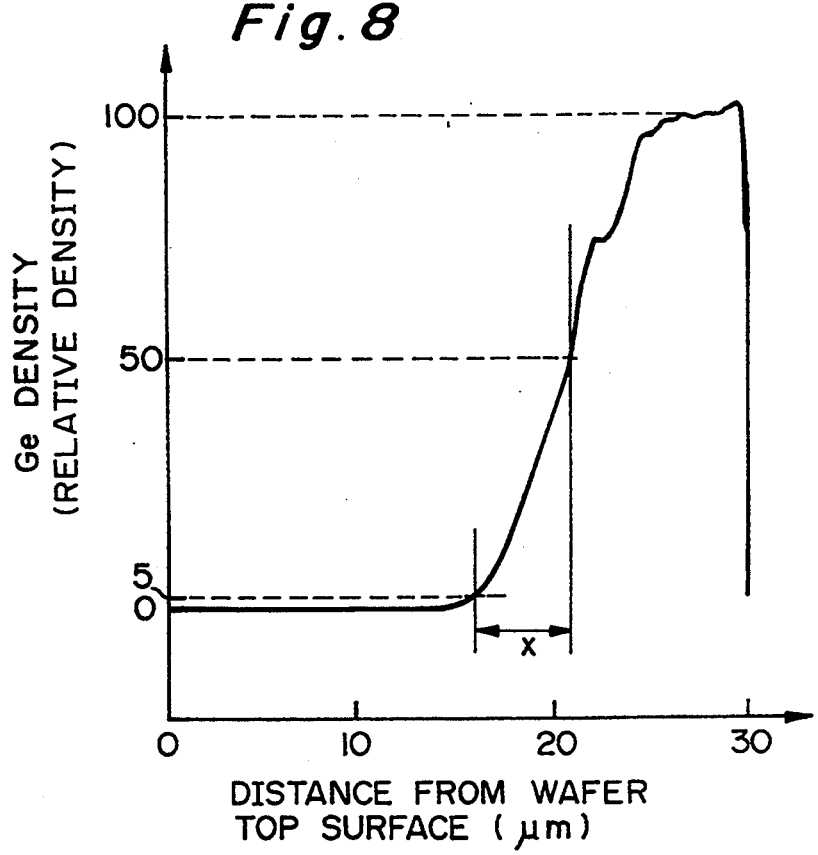
FIG. 8 is a view defining a parameter X for a diffusion ratio of Ge.

The measuring results are shown in FIG. 7. The parameter X for Ge diffusion ratios defined in FIG. 8 are taken on the vertical axis of FIG. 7, and the bulk densities are taken on the horizontal axis. It is seen in FIG. 7 that when the bulk density of the porous vitreous layer to be the under cladding layer is above about 0.3 $g/cm^3$, the diffusion of Ge, which is a refractive index increasing dopant, is suppressed substantially within a measuring error ($\sim \mu m$).

This invention is not limited to the above-described embodiments.

In the first to the third embodiments, a bulk density of the porous vitreous layer is increased by increasing a feed amount of a fuel gas ($H_2$ in these cases) to the burner. In the fourth embodiment, a bulk density of the porous vitreous layer is raised by depositing soot of a low bulk density and heating the surface by the burner. The bulk density is controlled by another method, in which a substrate temperature at which the soot sticks is raised. A substrate temperature is raised by the above-described heater in the bottom of the turntable, or by heating from above by a heater, a lamp or other means.

In still another possible method for raising a bulk density, in addition to the burner for synthesizing the glass, a burner is provided for the exclusive purpose of heating to assist the former burner in heating the substrate. In a different method, it is possible that following sticking of the soot and the formation of the porous glass vitreous layer, a substrate temperature is raised by providing heat via by the lower heater in the bottom of the turntable, the upper heater, the lamp or other means so as to increase a bulk density. Otherwise, the burner for synthesizing the glass may be brought close to the substrate upon sticking the soot thereby raising a substrate temperature.

The refractive index raising dopant is not limited to $GeO_2$, and instead $P_2O_5$, $Al_2O_3$ or others may be used. A refractive index lowering dopant may also be added to a material of the cladding layer.

The substrate is not limited to a Si substrate, and instead $Al_2O_3$ substrates, SiC substrates, $ZrO_2$ substrates, etc. may be used.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A process for forming an optical waveguide, comprising the steps of:
   (a) increasing a bulk density of at least an upper portion of a first porous vitreous layer while the first porous vitreous layer is being formed by Flame Hydrolysis Deposition,
   (b) forming a second porous vitreous layer on the first porous vitreous layer by Flame Hydrolysis Deposition, where the second porous vitreous layer contains a refractive index increasing dopant; and
   (c) heating the first and second porous vitreous layers to form an under cladding layer and a core layer, respectively, where the under cladding layer and the core layer comprise a transparent glass layer.

2. A process for forming an optical waveguide, comprising the steps of:
   (a) depositing glass soot on a substrate by Flame Hydrolysis Deposition to form a first porous vitreous layer,
   (b) heating at least an upper portion of the first porous vitreous layer to increase a bulk density of at least the upper portion of the first porous vitreous layer;
   (c) depositing glass soot containing a refractive index increasing dopant on the first porous vitreous layer by Flame Hydrolysis Deposition to form a second porous vitreous layer; and
   (d) heating the first and second porous vitreous layers to form an under cladding layer and a core layer, respectively, where the under cladding layer and the core layer comprise a transparent glass layer.

3. A process for forming an optical waveguide according to claim 2, further comprising the steps of:
   (e) etching the core layer to form an optical waveguide pattern;
   (f) depositing glass soot on the optical waveguide pattern and the under cladding layer by Flame Hydrolysis Deposition to form a third porous vitreous layer; and
   (g) heating the third porous vitreous layer to form an over cladding layer comprising a transparent glass layer.

4. A process for forming an optical waveguide according to claim 2, wherein
   the refractive index increasing dopant comprises at least one selected from a group consisting of $GeO_2$, $P_2O_5$, and $Al_2O_3$.

5. A process for forming an optical waveguide according to claim 2, wherein
   the upper portion of the first porous vitreous layer has a bulk density of above about 0.3 $g/cm^3$.

6. A process for forming an optical waveguide according to claim 2, wherein
   the upper portion of the first porous vitreous layer has a larger bulk density than the bulk density of the second porous vitreous layer.

7. A process for forming an optical waveguide, comprising the steps of:
   (a) depositing glass soot on a substrate by Flame Hydrolysis Deposition to form a first porous vitreous layer having a first bulk density, where the first bulk density is larger than a predetermined bulk density;
   (b) depositing glass soot containing a refractive index increasing dopant on the first porous vitreous layer to form a second porous vitreous layer having a second bulk density; and
   (c) heating the first porous vitreous layer and the second porous vitreous layer to form an under cladding layer and a core layer, respectively, comprising transparent glass layers,
   the predetermined bulk density being large enough to substantially prevent the refractive index increasing dopant contained in the second porous vitreous layer from diffusing into the first porous vitreous layer during said step (c).

8. A process for forming an optical waveguide according to claim 7, further comprising the steps of:
   (d) etching the core layer to form an optical waveguide pattern;
   (e) forming a third porous vitreous layer on the optical waveguide pattern and the under cladding layer by Flame Hydrolysis Deposition; and
   (f) heating the third porous vitreous layer to form an over cladding layer comprising a transparent glass layer.

9. A process for forming an optical waveguide according to claim 7, wherein
   the refractive index increasing dopant comprises at least one selected from a group consisting of $GeO_2$, $P_2O_5$, and $Al_2O_3$.

10. A process for forming an optical waveguide according to claim 7, wherein
    the predetermined bulk density is above about 0.3 $g/cm^3$.

11. A process for forming an optical waveguide according to claim 7, wherein
    the predetermined bulk density is larger than the second bulk density.

* * * * *